Oct. 21, 1930.     B. A. SMITH     1,778,965
POWER TAKE-OFF MECHANISM
Filed Aug. 9, 1929.     2 Sheets-Sheet 1

Inventor:
Bruce Alfred Smith
By
Pennie Davis Marvin & Edmonds
attorneys

Patented Oct. 21, 1930

1,778,965

UNITED STATES PATENT OFFICE

BRUCE ALFRED SMITH, OF BOX HILL, AUSTRALIA, ASSIGNOR TO SMITHCO FRICTION LIFT PROPRIETARY LIMITED, OF SOUTH MELBOURNE, VICTORIA, AUSTRALIA

POWER-TAKE-OFF MECHANISM

Application filed August 9, 1929, Serial No. 384,755, and in Australia September 10, 1928.

This invention relates to improvements in or connected with power raising, lowering and like adjusting devices for implements and machines and refers especially to devices for attachment to tractors whereby agricultural implements or other machines hauled thereby may be raised and lowered or parts thereof adjusted with ease and convenience.

The object of the present invention is to provide a device of simple and economical construction which can be readily adapted to tractors having a longitudinally disposed power take-off shaft whereby implements or machines drawn by the same may be raised or lowered or the parts thereof adjusted with ease and rapidity by the operator.

I accomplish the above mentioned object by providing one or more oscillatively mounted levers on the rear of the chassis of a tractor, and in connecting the said lever or levers to a crank or cranks associated with a worm wheel adapted to receive its motion from a worm arranged in alignment with a longitudinally disposed power take off shaft and adapted to be driven in right and left hand directions therefrom by reversing gearing receiving its motion from the said shaft and controlled by a foot or hand lever.

In order that the invention, the object and nature of which have been set forth, may be readily understood reference will now be had to the accompanying sheets of explanatory drawings, wherein one practical embodiment is illustrated and in which—

Figures 3, 4 and 5 are drawn to a larger scale than the other figures.

Figure 1:
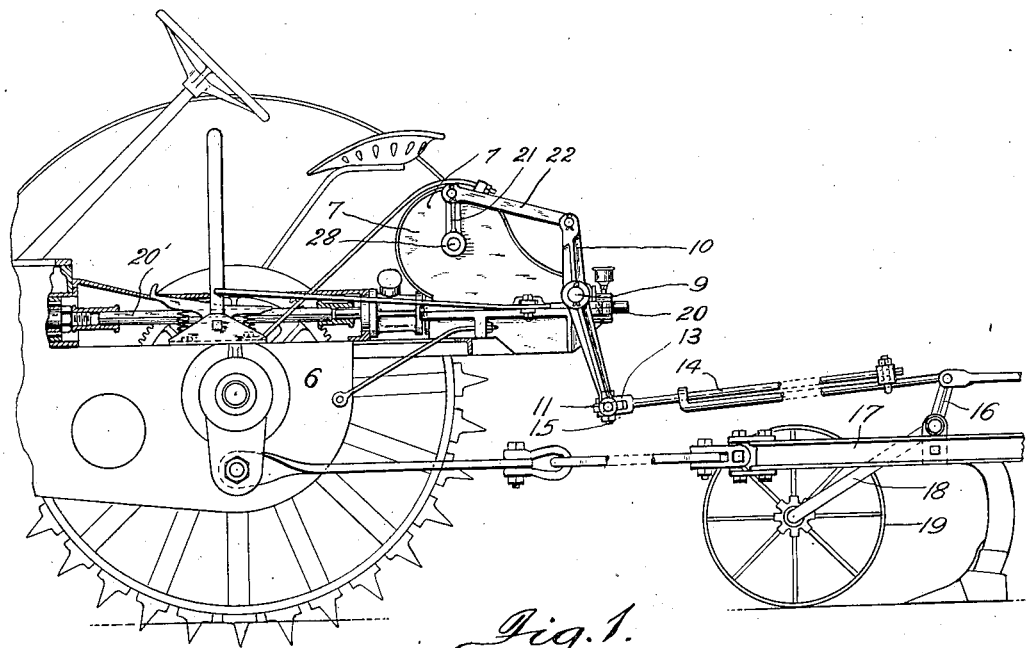
Figure 1 is a view in side elevation partly in section of the rear part of a tractor fitted with improvements constructed in accordance with the present invention.
Figure 2:
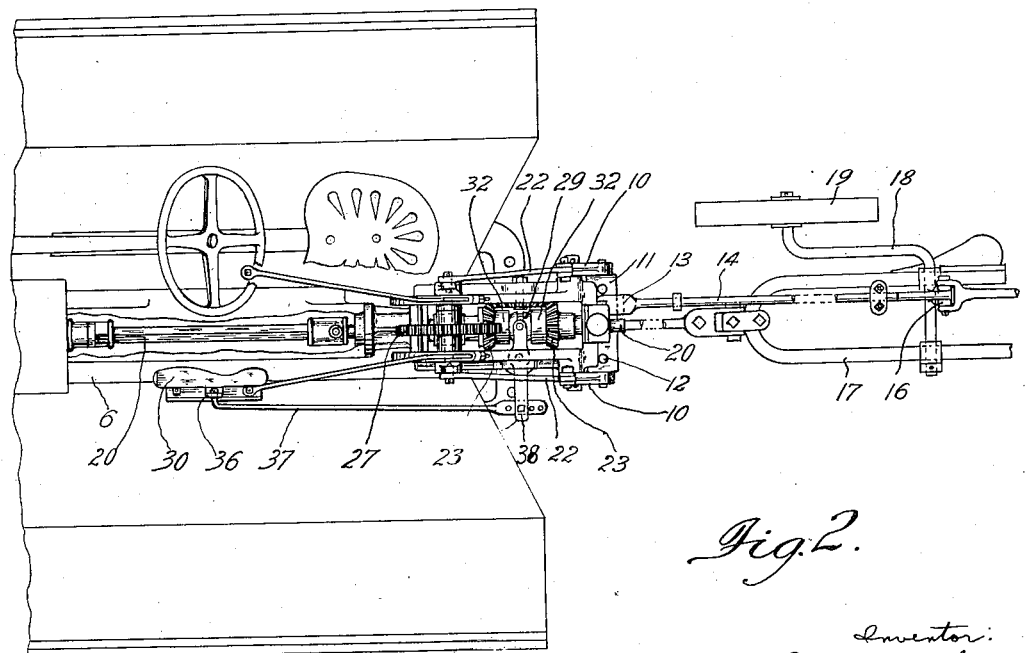
Figure 2 is a view in plan of Figure 1.
Figure 3:
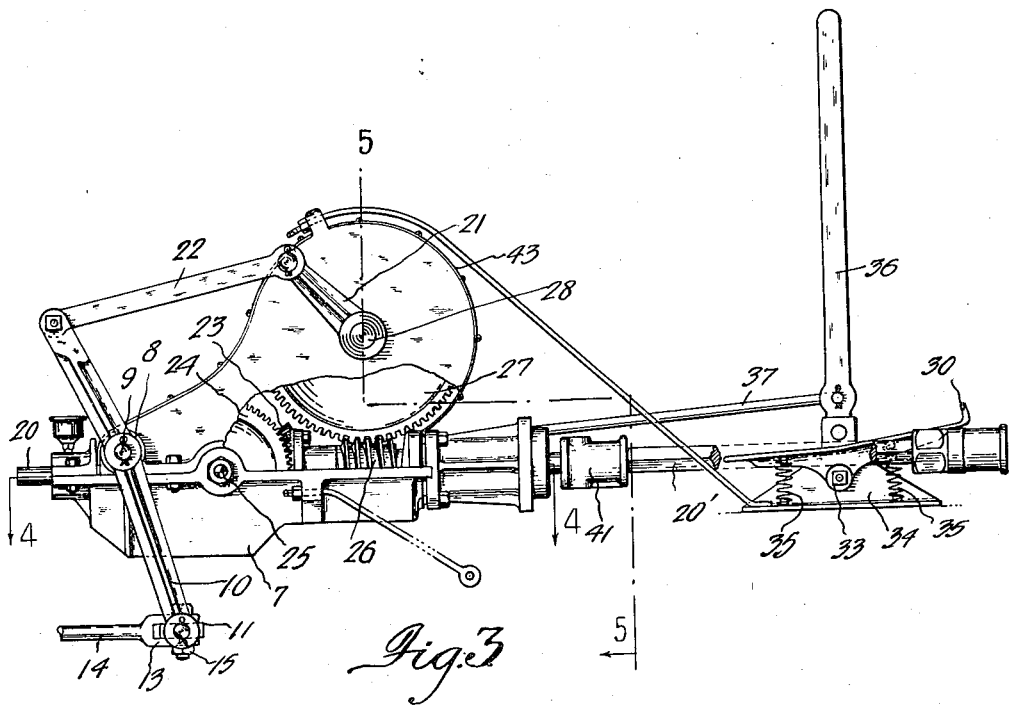
Figure 3 illustrates the invention apart from a tractor and viewed from the opposite side to Figure 1.

In these drawings the reference numeral 6 designates the rear part of the chassis of a tractor upon which is mounted a casing 7 divided horizontally into two parts. The upper part of the casing, at the rear end, is provided with bearings 8 which support a rock shaft 9 having levers 10 fitted thereto at points intermediate their ends.

The lower ends of the levers 10 are connected by a rocking bar 11 having a series of holes 12 in the length thereof. A jaw 13 on the front end of an adjustable rod 14 is connected by a bolt 15 to an approved point in the length of the rocking bar 11 and the rear end of the rod 14 is connected to an adjustment lever, as 16 on a plough 17 or other implement or machine connected to the tractor by a draw bar in the ordinary way.

The connection between the rod 14 and the rocking bar 11 is designed to permit of free movement of the adjustable rod whereby jamming will not occur when the tractor is turned at an angle to the implement.

The lever 16 on the part of the plough shown in the drawings is fitted to a crank axle 18 carrying a land wheel 19 and when a forward movement is imparted to the lever by actuating the levers 10 the plough frame is raised and when a rearward movement is imparted thereto the plough frame is lowered.

The oscillatively mounted levers 10 on the rock shaft are adapted to be actuated by reversing gear associated with a shaft 20 arranged in alignment with an extension on a power take off shaft 20' and embodying cranks or eccentrics 21 which are connected to the said levers by means of connecting rods 22.

The power take off shaft 20' is controlled by the engine clutch in the usual way and the rear end of the shaft 20 is provided with bevel pinions 23 meshing with a bevel crown wheel 24 supported on an arbor 25 carried by the casing surrounding the gear.

The bevel pinion 23 on the forward end of the shaft 20 is rigidly secured to or formed integrally with a worm 26 which meshes with a worm wheel 27 carried on a transverse spindle 28 rotatively supported in bearings in the casing.

The spindle of the worm wheel 27 is provided at each end with a crank 21 and these cranks are connected by the rods 22 to the upper ends of the levers 10 on the rock shaft 9 supported on the rear of the casing 7.

A sliding clutch member 29 is mounted on the shaft 20, between the bevel pinions 23 and is adapted to place one or other of the said pinions in fixed relationship with the shaft by operating a foot lever 30 under the control of the operator.

The clutch member 29 is slidably but nonrotatively mounted on the shaft 20 and its opposite ends are of conical formation and adapted to seat in correspondingly shaped recesses 31 formed in the inner ends of bosses 32 on the bevel pinions.

The foot lever 30 is pivoted centrally on a pin 33 carried in a bracket 34 fitted to the tractor and centralizing springs 35 are employed to return the lever to its normal position after being operated in either direction. A hand operated lever 36 is fitted to the pivot pin 33 and this lever is connected by a rod 37 to a clutch operating lever 38 pivotally mounted on the side of the casing 7. The inner end of the clutch lever is forked and pivotally supports a member 39 shaped to loosely engage with a circumferential recess 40 in the centre of the clutch member 29.

The front end of the shaft 20 is detachably connected to a sleeve fitted to the rear end of the extension of the power take off shaft and the said shaft 20 is rotatively supported in bearings in the casing 7.

Figure 4:
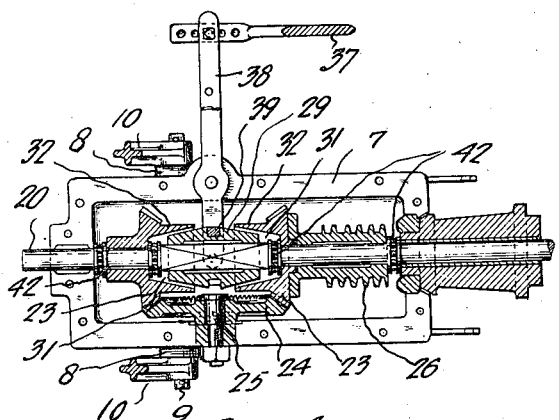
Figure 4 is a view in sectional plan taken on the dotted line 4—4 of Figure 3.
Figure 5:
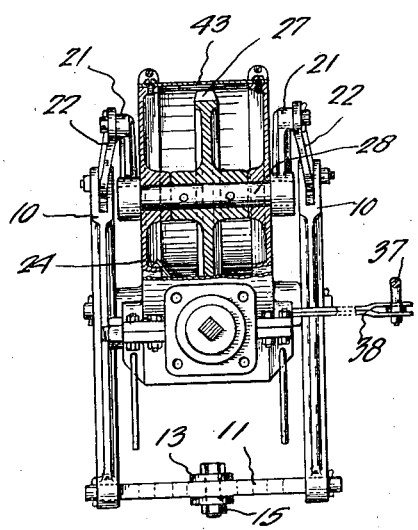
Figure 5 is a view in sectional end elevation taken on the dotted line 5—5 of Figure 3.

The bore of the clutch member can be square and the portion of the shaft 20 engaged thereby can be of a corresponding shape, see Figure 4 of the drawings.

The shaft 20 is fitted with thrust bearings 42 to ensure the free operation of the parts rotatively mounted thereon.

The casing 7 is provided with a removable cover 43 and stays 44 are employed to securely anchor the casing to the tractor.

Oil may be supplied to the lower part of the casing 7 and maintained at a level which will permit of the parts rotating with the shaft 20 dipping thereinto and being distributed to associated wearing parts.

In adapting the invention to a tractor having a power take off shaft projecting from one side of the power unit thereof the shaft 20 is extended rearwardly and is fitted with a bevel pinion arranged to mesh with a like pinion fitted to the take off shaft.

It will be obvious that a single crank 21 and a single lever 10 can be employed to actuate the raising and lowering lever 16 but that the duplication of these parts and arrangement shown in the drawings will balance the stresses applied to operative parts when the device is in action.

In the drawings the plough frame is shown in a lowered position and in order to raise the frame the clutch is actuated by the driver of the tractor to place one of the pinions 23 in fixed relationship with the shaft 20 which is constantly in motion.

When a pinion 23 is placed in fixed relationship with the shaft rotation is imparted to the worm and worm wheel and the movement of the cranks cause the levers 10 to be actuated to impart a forward movement to the lever 16 associated with the cranked axle 18 on the plough.

When the plough frame has been raised to a desired height the driver releases the clutch operating mechanism and the clutch will be returned to its neutral position by means of the centralizing springs 35.

In order to lower the plough frame the clutch operating mechanism is operated in a reverse direction.

In the drawings the invention has been shown adapted to actuate the raising and lowering mechanism of a plough but it will be obvious that the rod 14 can be connected to raising and lowering levers or other mechanism of different implements or machines drawn by the tractor whereby they may be raised and lowered or the parts adjusted as required.

I claim:—

1. A power driven device for controlling an implement or part of an implement drawn by a tractor, comprising a shaft in alignment with and coupled to a longitudinally disposed power take off shaft, a worm rotatively mounted on the shaft, a worm wheel meshing with the worm and having a crank or cranks fixedly associated therewith, link connections between the crank or cranks and a lever or levers oscillatively mounted on the rear of the tractor, a connection between the levers and an adjustable part of the implement, reversing gear adapted to receive its motion from the shaft for controlling the direction of movement of the worm on the shaft, and a manually operated device for controlling the reversing gear.

2. A power driven device for controlling an implement or part of an implement drawn by a tractor, comprising a shaft disposed longitudinally of the tractor and adapted to be driven from a power take off shaft, a pair of oppositely disposed bevel pinions rotatively mounted on the shaft, a crown wheel meshing with the pinions, manually operated clutch mechanism for placing one or other of the pinions in fixed relationship with the shaft, a worm rotatively mounted on the shaft and fixedly associated with one of the bevel pinions, a worm wheel meshing with the worm, cranks or eccentrics having a fixed relationship with the worm wheel, one or more oscillatively mounted levers, links connecting the cranks or eccentrics to the levers, and a connection between the lever or levers and an adjustable part of the implement.

3. A power driven device for controlling an implement or part of an implement drawn by a tractor, comprising a casing mounted on the tractor, a shaft rotatively mounted longitudinally in the casing and adapted to be driven from a power take off shaft, a pair of oppositely disposed bevel pinions rotatively mounted on the shaft, a crown wheel rotatively mounted within the casing and meshing with the pinions, manually operated clutch mechanism for placing one or other of the pinions in fixed relationship with the shaft, a worm rotatively mounted on the shaft and fixedly associated with one of the bevel pinions, a worm wheel mounted on a spindle and meshing with the worm, cranks or eccentrics on the spindle, one or more oscillatively mounted levers on the rear of the tractor, links connecting the cranks or eccentrics to the levers, and a connection between the lever or levers and an adjustable part of the implement.

4. A power driven device according to claim 2, wherein the oscillatively mounted levers are pivotally supported intermediate their ends and their upper ends are connected by links to the cranks or eccentrics, a bar is pivotally mounted in and connects the lower ends of the oscillatively mounted levers, and an adjustable connecting rod has its front end pivotally connected to the bar connecting the lower ends of the levers and its rear end to an adjustable part of the implement.

5. A power driven device according to claim 2, wherein the inner ends of the oppositely disposed bevel pinions are provided with bosses having conical shaped recesses, a clutch member is slidably but non-rotatively mounted on the shaft between the bevel pinions and has oppositely tapering ends adapted to be placed in frictional engagement with the recesses in one or other of the pinions, and a manually controlled lever and connections are provided for imparting an end movement to the clutch member.

6. In a power driven device according to claim 2, bosses on the inner ends of the bevel pinions having conical shaped bores, a clutch member having oppositely tapering ends slidably but non-rotatively mounted on the shaft between the bevel pinions, a manually controlled lever and connections for imparting an end movement to the clutch member, a circumferential recess in the centre of the clutch member, a pivoted clutch lever supporting a member loosely engaged by the circumferential recess, a rod connecting the clutch lever to a hand operating lever, an oscillatably mounted foot lever having a fixed relationship with the hand lever, and centralizing springs bearing on opposite sides of the pivot point of the foot lever for returning the same and the clutch member to their neutral positions when the foot lever is released.

In witness whereof I hereunto affix my signature.

BRUCE ALFRED SMITH.